US010332384B1

United States Patent
Schryer et al.

(10) Patent No.: US 10,332,384 B1
(45) Date of Patent: Jun. 25, 2019

(54) ACTIONS AND COMMUNICATIONS RESPONSIVE TO REAL-TIME EVENTS INCORPORATING LOCAL, REMOTE AND LEARNED INFORMATION

(71) Applicant: Observables, Inc.

(72) Inventors: Abraham M Schryer, Santa Ynez, CA (US); Ronald Richard Gans, Santa Barbara, CA (US); Skylar Dante Jones, Santa Barbara, CA (US)

(73) Assignee: Observables, Inc., Santa Barbara, CA (US)

( * ) Notice: Subject to any disclaimer, the term of this patent is extended or adjusted under 35 U.S.C. 154(b) by 0 days.

(21) Appl. No.: 16/046,817

(22) Filed: Jul. 26, 2018

(51) Int. Cl.
- *G08B 27/00* (2006.01)
- *G08B 29/00* (2006.01)
- *G06N 20/00* (2019.01)
- *H04L 29/08* (2006.01)

(52) U.S. Cl.
CPC ............ *G08B 27/005* (2013.01); *H04L 67/12* (2013.01); *G06N 20/00* (2019.01); *H04L 67/10* (2013.01)

(58) Field of Classification Search
None
See application file for complete search history.

(56) References Cited

U.S. PATENT DOCUMENTS

| | | | |
|---|---|---|---|
| 2014/0025337 A1* | 1/2014 | Blount | G05B 23/0221 702/183 |
| 2018/0321356 A1* | 11/2018 | Kulkarni | G01S 5/14 |
| 2018/0332434 A1* | 11/2018 | Kulkarni | H04W 4/021 |

* cited by examiner

*Primary Examiner* — Muhammad N Edun
*Assistant Examiner* — Jerold B Murphy
(74) *Attorney, Agent, or Firm* — SoCal IP Law Group LLP; Mark Andrew Goldstein

(57) ABSTRACT

Systems and methods providing actions and communications responsive to real-time events incorporating local, remote and learned information are disclosed. The system includes a cloud application on a cloud server and a premises device at a premises. The premises device has a plurality of sensors coupled to and/or included in the premises device. The cloud application receives signals, status and other information from the premises device. The cloud application also obtains information from third party information sources. The cloud application obtains location and other pertinent information about key persons. The cloud application evaluates actions to take in response to signals, status and information received from the premises device taking into consideration information from the third party information sources and information about key persons.

30 Claims, 5 Drawing Sheets

ACTIONS AND COMMUNICATIONS RESPONSIVE TO REAL-TIME EVENTS INCORPORATING LOCAL, REMOTE AND LEARNED INFORMATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to residential and commercial monitoring, automation and security systems and related components that that include a premises device and a cloud server to take actions and make communications responsive to real-time events incorporating local, remote and learned information.

Description of the Related Art

Residential and commercial monitoring and security installations include a wide variety of sensors and components. A local controller or premises device may be the hub for the on-location sensors. This may be an alarm panel. Historically, actions were taken in response to the information and signals provided by sensors at the location. However, in current times, additional information is readily available via the Internet. Information provided by third party sources online may impact a preferred or best response to a signal or information at a location. Information from external sources may provide context and additional information that alters an action or contact to be made in response to the local information or signal. Further, information about the location available from a company, owner, or other occupant at a location has not traditionally been used to evaluate and determine a preferred or best response or action taken resulting from a signal or information from local sensors, even though it can alter a preferred response or action. Similarly, information about the key personnel affiliated with or servicing the company, owner, or other occupant at a location has not traditionally been used to evaluate and determine a preferred or best response or action taken resulting from a signal or information from local sensors, even though it can alter a preferred response or action. The systems and methods described herein provide improved evaluation and selection of actions and responses to real-time events that incorporate local, remote and learned information.

DETAILED DESCRIPTION

A control, monitoring and alert system (CMAS) that includes a premises device at a home, office or other location running a premises application and a cloud server running a cloud application that evaluates communications responsive to real-time events at the location incorporating local, remote and learned information is described herein. The premises device includes a microprocessor, network communications components and related software which receive signals and information from external sensors and components, and communicate with the cloud application. The premises application and cloud application included in the CMAS combines with an optional mobile application and website interface to enable a system operator to configure sensors and components coupled with the premises device. The cloud application runs in tandem with the premises application to configure premises sensors and components. The cloud application allows system operator affiliated with the premises to specify local information such as work schedules for personnel and building schedules which are used by the cloud application in evaluating and determining actions to be taken and communication to be sent in response to information and signals received from the premises device. The cloud application allows a system operator affiliated with the premises to specify service provider personnel such as electricians, plumbers, HVAC contractors, etc. which are used by the cloud application in evaluating and determining actions to be taken and communication to be sent in response to information and signals received from the premises device.

In addition, the cloud application communicates with multiple third party resources to obtain information pertinent to the decisions to be made and actions to be taken in response to local signals and information, such as weather reports, weather incidents, fire incidents, flood information, police activity, and the like. Third party information about the status of utilities such as water, electricity and gas as well as internet connectivity is also obtained by the cloud application to assist in evaluating actions to be taken in response to signals and information for premises device connected sensors. Based on third party information and local information, the cloud application prepares responses and communications responsive to signals and information received from the premises application originating from the premises sensors and components. Moreover, machine learning incorporating user adjustments and changes responsive to earlier issued responses and communications is a notable improvement.

The System

Figure 1:
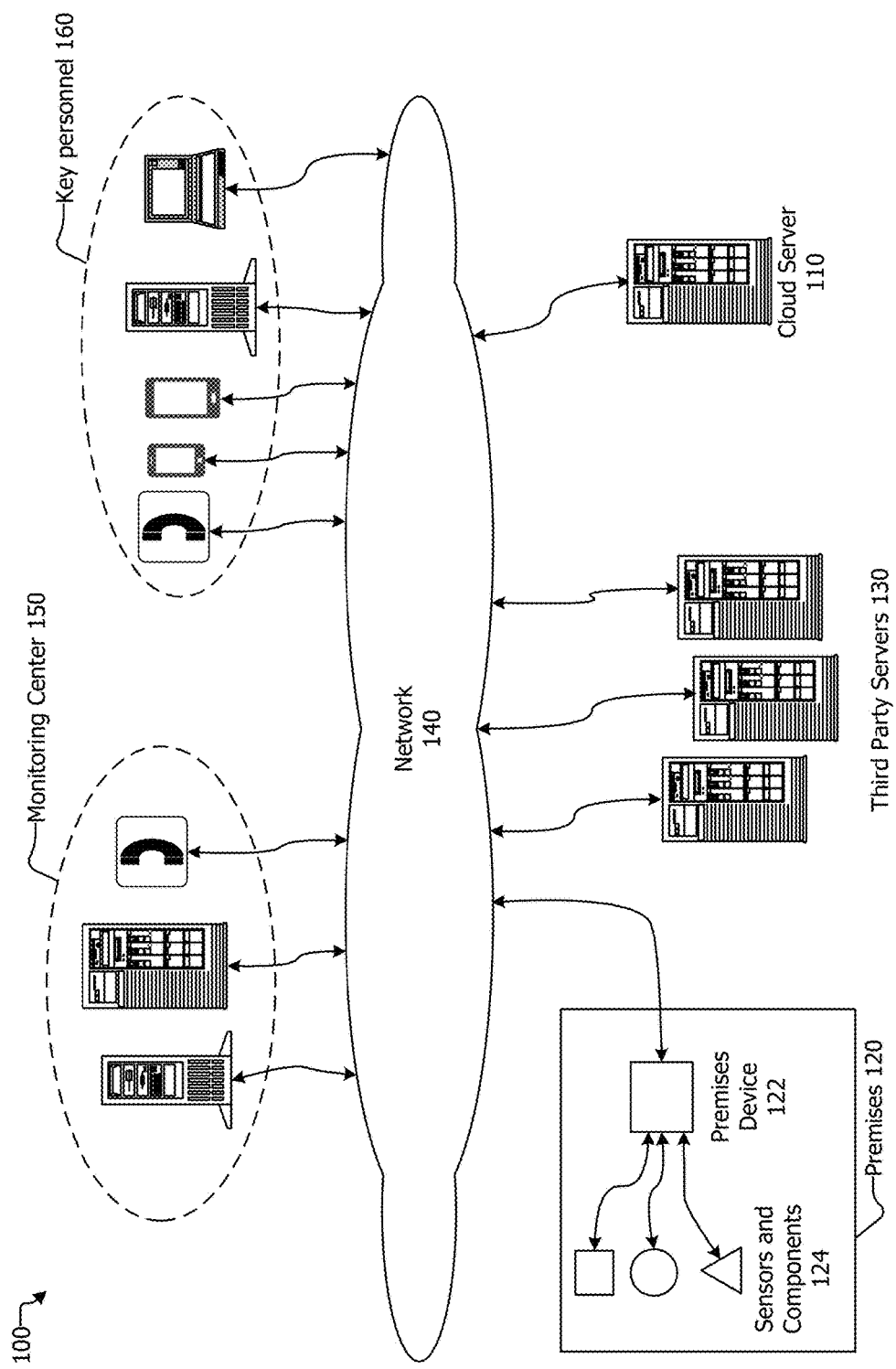
FIG. 1 is a block diagram of an environment in which the systems and methods described herein operate.

Referring now to FIG. 1, there is shown a block diagram of an environment 100 in which the control, monitoring and alert system (CMAS) described herein operates. The CMAS includes a cloud server 110 running a cloud application that provides a website and mobile application support to users on computing devices over network 140. Users of the CMAS, namely a system operator affiliated with a premises, control, manage and configure sensors and components 124 external to a premises device 122 at a premises 120 by accessing the website provided by the cloud application at cloud server 110 via computing devices using a web interface provided by cloud application at the cloud server 110 or a mobile application provided as part of the CMAS. The cloud server 110 takes high level commands, configuration and other information provided by system operators via their computing devices over network 140 and sends it to the premises device 122.

The cloud server 110 receives information provided by system operators about key personnel 160 via their computing devices over network 140 and sends it to the premises device 122. Key personnel include owners, managers and leaders of a company or household at a particular location. The information provided by system operators via their computing devices to the cloud application at cloud server 110 include building access/open hours, office hours, contact information for third party contractors and service providers, and contact information for owners, managers and leaders of a company or household at the particular location. In some versions of the CMAS the current location of owners, managers and leaders of a company or household may regularly be reported to and received by the cloud application at the cloud server 110.

The premises device 122 directly communicates with the external sensors and components 124, and a premises application on the premises device 122 sends signals, status information, external device data and other information to the cloud application on the cloud server 110. The premises device 122 may also include onboard sensors and report signals and information from onboard sensors to the cloud application on the cloud server 110. The cloud application running on the cloud server 110 provides alerts, sensor data and other information directly and/or via a web interface or app interface over network 140 to key personnel 160 at their computing devices. Key personnel 160 include one or more system operators. The cloud application running on the cloud server 110 provides alerts, sensor data, updated contact or call lists and/or updated action lists and other information directly over network 140 and/or via a web interface or app interface over network 140 to monitoring center 150.

A computing device as used herein refers to any device with a processor, memory and a storage device that executes instructions including, but not limited to, personal computers, server computers, computing tablets, smart phones, portable computers, and laptop computers. These computing devices may run an operating system, including, for example, variations of the Linux, Android, Microsoft Windows, Apple iOS and Apple Mac operating systems.

The cloud server 110, premises device 122, third party servers 130, key personnel 160 and monitoring center 150 communicate through a network 140. The network 140 comprises one or more public and/or private data networks, and other networks and sub-networks, and may include or be the Internet. The network 140 may also include or access cellular telephone networks, land line telephone networks, cable television networks, private and/or public wide area networks (WANS), private or public local area networks (LANS), may include satellite links and microwave transmission links, and may be wired and wireless or a combination. In addition, Global Positioning System (GPS) information providing location information may be accessed directly outside of the network 140 by cloud server 110, premises device 122, sensors and components 124, third party servers 130, and computing devices of key personnel 160. The network 140 includes additional devices, not shown, such as routers, switches, firewalls, multiplexors and other networking equipment that enable and enhance network communications and network security. Additional specialized servers such as application servers, database servers, and others may be coupled with or included in the CMAS 100 and/or may be accessed by the cloud server 110 over network 140. Although only one cloud server 110 and one premises device 122 are shown, multiple cloud servers 110 and premises devices 122 may be involved in the CMAS. Multiple premises devices 122 may be at multiple locations and/or at a single location. Monitoring center 150 may be coupled with the network 140 so that signals and status information from sensors and components 124 and/or premises device 122 at premises 120 may be communicated to the monitoring center 150 directly and/or via the cloud application on the cloud server 110, so that updated action lists and/or communication contact lists prepared by the cloud application may be communicated from the cloud application on the cloud server 110 to the monitoring center 150. Although only one premises 120 is shown, multiple premises may be included in the MCAS 100.

The methods described herein may be implemented on one or more server computers referred to herein as cloud server 110 running the cloud application, one or more premises devices 122 at one or more premises 120 running premises application software, multiple computing devices of key personnel 160 associated with multiple premises 120, and multiple monitoring centers 150 and the computing devices therein. The key personnel 160 use computing devices to access the cloud server 110 via a MCAS mobile application running on mobile computing devices or a web interface provided by the cloud application running on cloud server 110 via web browsers included on the computing devices of key personnel 160, and also receive communications (for example, text messages, email, voice calls, automated audio calls) originating from the monitoring center 150 and/or the cloud application on the cloud server 110.

A server computer includes software and hardware for providing the functionality and features described herein. A server computer may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). Certain portion of the methods, functionality and features described herein are embodied in software which operates on a server computer and may be in the form of firmware, an application program, an applet (e.g., a Java applet), a browser plug-in, a COM object, a dynamic linked library (DLL), a script, one or more subroutines, or an operating system component or service. Server computers include the cloud server 110 as well as servers at the monitoring center 150 and the third party servers 130.

The MCAS techniques may be implemented in software and stored on a machine readable storage medium in a storage device included with or otherwise coupled or attached to the cloud server 110 premises device 122. That is, the MCAS software is stored on machine readable storage media. These storage media include various kinds of physical media, namely: magnetic media such as hard disk drives (HDDs); optical media such as compact disks (CD-ROM and CD-RW) and digital versatile disks (DVD and DVD±RW); silicon media such as solid-state drives (SSDs) and flash memory cards; and other magnetic, optical or silicon storage media. As used herein, a storage device is a device that allows for reading and/or writing to a storage medium. Storage devices include hard disk drives, DVD drives, SSDs, EEPROMs, flash memory devices, and other magnetic, silicon, optical or other physical media.

Figure 2:
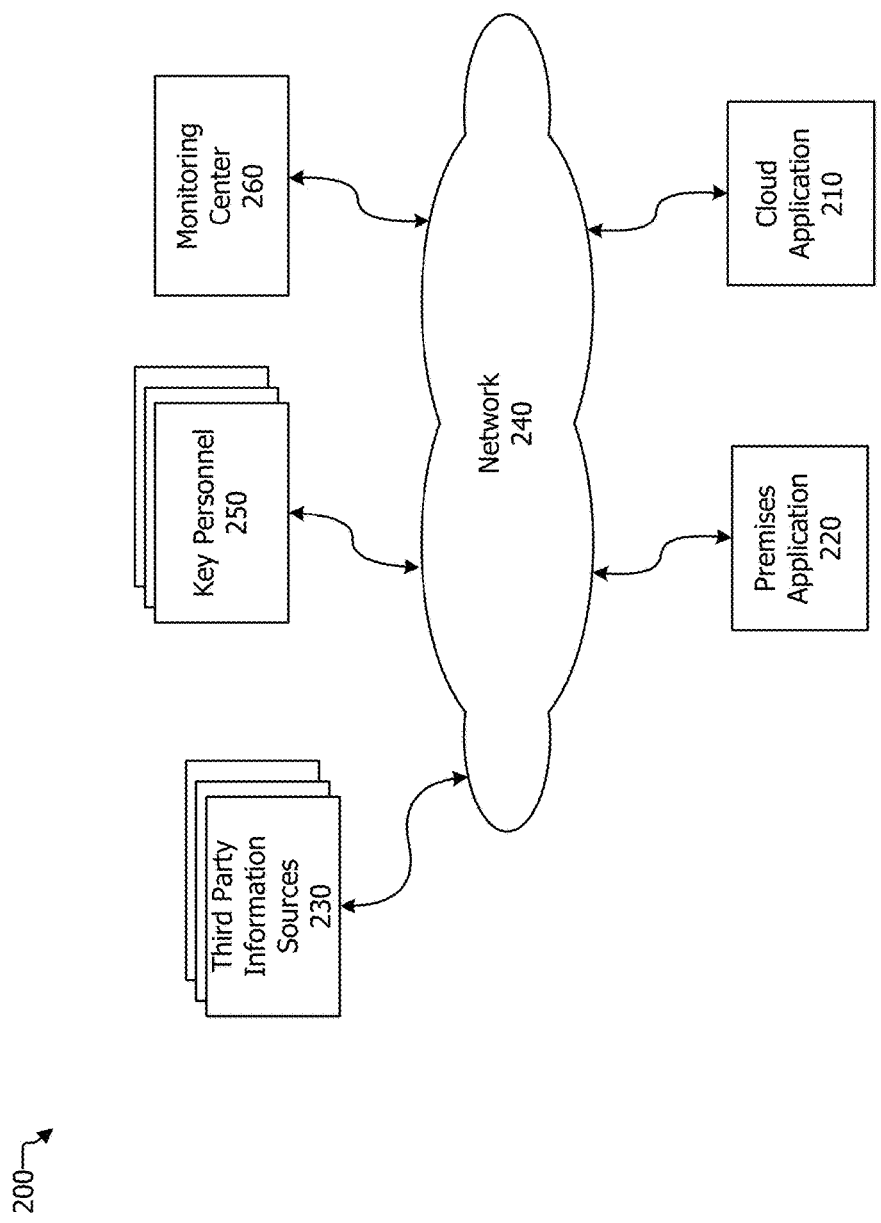
FIG. 2 is a block diagram of a virtual configuration of the system described herein.

Referring now to FIG. 2, there is shown FIG. 2 is a block diagram of a virtual configuration of the system described herein. This discussion also includes reference to FIG. 1 The MCAS 200 includes cloud application 210 on a cloud server 140 that includes website and mobile application support software. The MCAS 200 may include a mobile application running on mobile computing devices of key personnel 250. A system operator and/or other key personnel 250 via their computing devices provide configuration, control commands and other information over network 240 to the cloud application 210 via a website and/or app support software of the cloud application 210 running on the cloud server 110. The cloud application 210 includes premises device support software that communicates with premises application 220 running on premises device 122 at premises 120 over networks 140 and 240. The cloud application 210 communicates control, configuration and command information received from a system operator and/or other key personnel 250 to and receives data and signals from the sensors and components 124 and premises device 122 from premises application 220 that runs on premises device 122.

The premises application 220 on premises device 120 takes inventory of all connected external sensors, devices and components. The sensors, devices and components 122 include alarm panels, key pads, access readers, phones, intercoms, door controllers, roof sensors, gun shot detectors, keycard readers, badge readers, man-traps, virtual wires, tamper detectors, biometric devices such as ophthalmic and fingerprint readers, temperature sensors, fire alarms, light sensors, motion sensors, water sensors, humidity sensors, window state sensors, audio sensors, earthquake sensors, accelerometers, door sensors, glass break sensors, video cameras or sensors, and others. The sensors, devices and components may be included in a single structure, be part of a campus or plant, or be spread across one or more buildings on a property site and may include sensors, devices and components inside and outside of buildings. The premises may be a boat, recreational vehicle or other movable structure or vehicle; may include property and buildings, and structures; may include multiple buildings or structures; may be or have adjacent to it vehicles.

The cloud application 210 provides an easy to use graphical interface via a web interface and associated mobile application that provides system operators and/or other key personnel the ability to view, monitor, configure and control the external devices, components and systems 122 coupled with the premises device 122 via premises application 220. The premises device 122 and premises application 220 support as external components virtually any sensor that communicates via a voltage, current, resistance, or communication bus message or signal.

The cloud application 210 allows system operators and certain key personnel 250, such as owners, managers and company leaders, to specify local information such as work schedules for personnel and building schedules as well as time clock information (that is, when personnel have checked in or out of a building or office) which are used by the cloud application 210 in evaluating and determining actions to be taken and communication to be sent in response to information and signals received from the premises device 122 via premises application 220. The cloud application 210 allows system operators and other key personnel 250 to specify service provider personnel (also referred to as and included in key personnel 250) such as electricians, plumbers, HVAC contractors which are used by the cloud application 210 in evaluating and determining actions to be taken and communication to be sent in response to information and signals received from the premises device 122 via premises application 220.

In addition, the cloud application 210 communicates with multiple third party information resources 230 to obtain information pertinent to the decisions to be made and actions to be taken in response to local signals and information, such as weather reports, weather incidents, sunrise and sunset times, fire incidents, flood information, police activity, and the like. Third party information about the status of utilities such as water, electricity and gas as well as Internet connectivity is also obtained by the cloud application 210 from third party information sources 230 to assist in evaluating actions to be taken in response to signals and information from premises device 122 connected sensors and device 122 via the premises application 220. Third party information sources 230 include weather forecasters, police departments, fire departments, local governments, National Weather Service, as well as utilities such as water electric, national gas and Internet providers, and others. Based on third party information and local information, the cloud application 210 prepares responses and communications responsive to signals and information received from the premises application 220 originating from the premises sensors and components 124. Moreover, the cloud application 210 incorporates machine learning incorporating user adjustments and changes responsive to earlier issued responses and communications. The machine learning makes conclusions and deductions based on sensed and monitored activities so that false positives and false alerts are reduced or eliminated.

Here is one example of machine learning performed by the cloud application. In this example there is a freezer at a premises with a temperature monitor associated with the freezer. The system monitors the freezer temperature. It is preferred that the freezer temperature stays within a defined range. The cloud application may implement a basic rule that when the freezer leaves a certain temperature range, an alert is sent to a designated freezer repair person. Although this is a good general rule, freezers have regular defrost cycles. Rather than trying to predict what those cycles are and create rules around them, the machine learning in the cloud application learns the defrost cycle based on measurements made. That is the machine learning component deduces or learns that there is a defrost cycle in response to regular monitoring of the freezer. The cloud application can then distinguish between "normal" behavior and abnormal problems such that alerts are only sent during an abnormal temperature and ignore anticipated or regular temperature changes. In this example situation, a failsafe rule can be included such that a temperature change outside the desired range for greater than the period of time of a typical defrost cycle causes an alert or alarm to be triggered for further investigation by designated key personnel.

The cloud application 210 upon receipt of certain signals, information and/or alerts from the premises application 220 evaluates information provided by the key personnel 250 as well as information stored or pulled from third party information sources 230 and sends an updated communication list and related actions to a monitoring center 260. The monitoring center 260 may be a third party service that provides responses to signals and alerts from the premises. Historically, the monitoring center receives motion detector, fire sensor, door open or glass break alerts and in response to those, calls key personnel, fire and/or police as the case may be. As set forth in more detail below regarding FIG. 4, the cloud application 210 provides the monitoring center 260 with an updated, relevant contact list to use in handling current, real-time alerts and signals at a premise. The cloud application may provide a communication list containing the names, roles and communication method to be used to contact key personnel as well as police and/or fire based on a plurality of information. For example, if a water sensor shows too much water is being used, a particular plumber and company manager should be sent a text message. In one embodiment, the geographical location of key personnel may be known such that a manager, plumber or other key person geographically closest to the premises is contacted. Further, time of day may factor into which communication method is included in the updated communication list, such that office phone is not called at night if the office hours are 9:00 a.m. to 5:00 p.m. Many more permutations of rules based on available information are used including machine learning to improve the kinds of communication and response specified in the communications list created by the could application 210 and sent to the monitoring center 260.

In one implementation, the cloud application rules engine may include rules based on the following:

Trigger—Specifies what external event launches the rule. Triggers include inputs, such as message received, signal received, measurement made, property changed, picture or video clip taken, anything from any of the listed data sources/sensors, or based on a certain time interval or time (date, time, day of week, time of day, etc.).

Scope—Specifies how broadly to apply the rule. Scope covers how widely the rule is applied. The rule may apply to a certain sensor, a particular building, an entire campus, an organization, etc.

Conditions—Limit when the rule runs. Conditions are constraints around the rules. Conditions include the type of message, measurements in certain ranges, the day or time of day, weather conditions, no more often than a certain frequency, and others.

Actions—What to do when the rule runs and the application condition or conditions are met. Actions are what happens when the rule's condition or conditions are met. Actions include send email, send SMS, send text to voice, specify escalation path, alert monitoring center, take automatic action on premises, alert police, alert fire, alert key personnel, etc.

In one version of the cloud application a rule-based state machine is used. In another version of the system, the rule-based state machine is included in the premises application in the premises device. In another version of the system, portions of the rule-based state machine are included in both the cloud application and the premises application. In the state machine, a flow is a set of states, containing rules, governed by inputs, and producing outputs. A flow contains a map of states keyed by the StateID. Each flow contains an ordered list of rules executed from any state. A flow tracks the current state and last state change time and allows for custom storage of key-value pairs for rules. Multiple flows are supported. A state is a position in a flow. Each state contains an ordered list of rules that are executed when in that state. A rule is a condition that depends on input, namely information, signals and data from sensors at and provided from a premises device as well as third party information sources. The evaluation of a rule results in a true, false, or indeterminate evaluation. If a rule evaluates to true, associated outputs are communicated and/or the particular related or associated state is changed. A container rule is a special type of rule that contains one or more other rules and bases its condition on the conditions of the contained rules. Container rules may be nested. An input is any sensor or other component included with or coupled to a premises device that changes independently and whose properties can be measured, typically signals, data, messages or status the local system receives from connected external components and external systems. Example input includes GPIO pin signals, motion detection signals and status, temperature, time, humidity, light on, door open, window open, broken glass, elapsed time since a particular event or occurrence, and others. An output from the cloud application at the cloud server may also be an input to a premises device and/or and external component coupled with, included in or connected to the premises device. An output includes an aspect of the premises device or a component connected or coupled with the premises device that can be set or controlled, typically configuration information and instructions or commands to connected external components and external systems. Other outputs include instructions to send a message to a monitoring center server, send message to a key person, send a pin signal to a particular component or device, send email, send text message, send SIP communication, send local network message, set premises device LED on or off, send command signal to unlock door at premises, send command signal to trigger an audio alarm at premises, send command signal to trigger a visual alarm at premises, and others.

Example rules included with the state machine include: evaluating if pin is high or a signal code received, then entering a particular state; evaluating if a temperature is outside of a predefined or user specified range, then issuing a command to the premises device to turn on a heater and/or sending an alert communication to the monitoring center; evaluating if a time since a last transition is too large or exceed a threshold then taking a pre-defined or user specified action; evaluating if a signal or pin or combination of signals and pins from one or multiple sensors or components coupled with or connected to the premises device is high while another is also high then taking a predefined or user specified action. The predefined actions may be system defined defaults and/or may be specified by a system operator during initial configuration or later configuration and tuning of the cloud application's machine learning and intelligence system. System operator specified actions may be provided via the web interface or mobile application to the cloud application on the cloud server.

Upon initial configuration of the cloud application by a system operator, the cloud application may provide an easy to use configuration user interface that enables a system operator to set triggers, namely boundaries, thresholds and time periods relating to sensors and components coupled with the premises device. Predefined cloud application defaults may be provided for some or all sensors and components, and the cloud application may allow the system operator to customize the values to meet the needs of the particular premises. The rules in the cloud application obtain not only signals and status from the sensors and components on the premises device but also obtain (pull) and receive (push) pertinent information from third party information sources. For example, a rule relating to fire detection may obtain humidity and outside temperature information from a weather information source and compare it to the humidity and temperature from sensors coupled or included with a premises device while also checking whether there is a power outage in the geographical area near the premises and whether the air conditioning system at the premises is functioning to evaluate whether there is a fire in the building.

Other rules take into consideration the kind of signal (input) received to determine which key personnel should be contacted (output). For example, prepare a call or contact list to be sent to the monitoring center that includes the closest company leader and particular trade specialist based on the temperature being too high or too low, such as an HVAC contractor. In this rule an additional consideration of time of day may be evaluated to determine the kind of communication recommended based on an urgency determination, such as, for example, direct immediate phone call for most urgent, email for less urgent, or text message for urgent. Other simple and complex rules such as these examples may come pre-installed in the cloud application, may be customized by system operators using the cloud application, and may be authored by the system operator or cloud application provider for specialized or unique configurations.

The Premises Device

Figure 3:
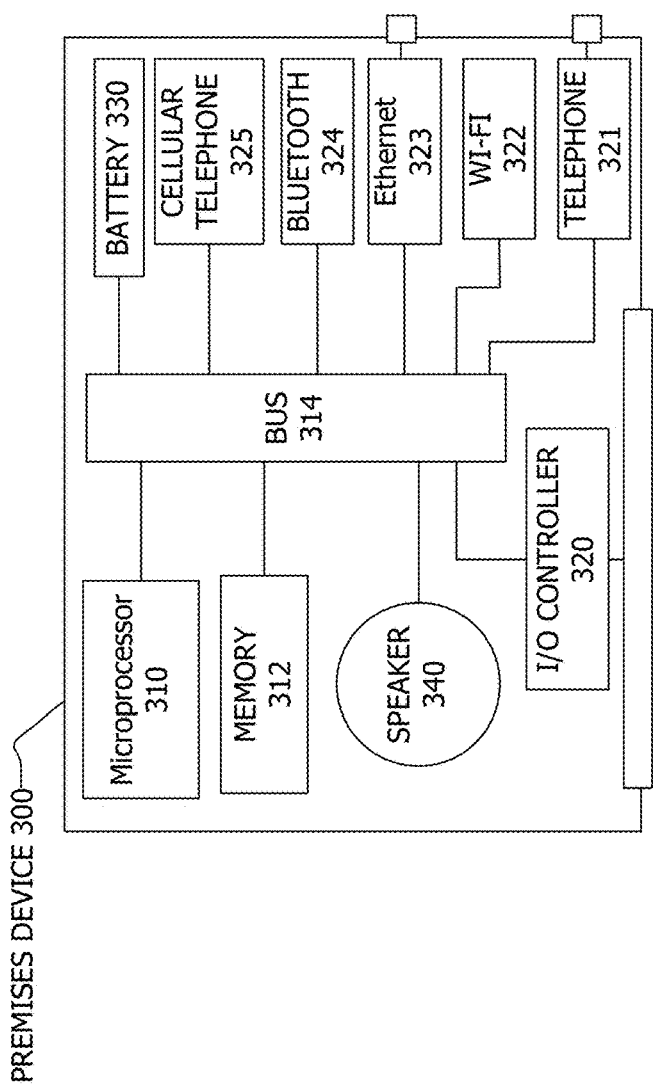
FIG. 3 is a block diagram of the components of an example premises device that implements a portion of the systems and methods described herein.

Referring now to FIG. 3, there is shown a block diagram of an example of the components of an example premises device 122 that implements a portion of the systems and methods described herein. The premises device 300 may include or be a single board having multiple components. The premises device 300 may include multiple boards. The premises device 300 includes a microprocessor 310 to execute instructions or software stored on a storage device 312 that implements the premises application 220, including at least one state machine. The storage device 312 may be a ROM, EEPROM, flash memory and the like. The premises device 300 includes electronics and software that allows for communicating with the cloud server 110 and with external sensors and component. The premises device 300 includes electronics and software to allow for one and or two-way communications with the cloud server 110 and sensors and components 122 devices. The premises device 300 may support some or all of Internet communications, cell phone communications, satellite communications, microwave transmissions, and others. Specifically, the premises device 300, in various embodiments, includes some or all of a telephone system component 321, a cellular telephone component 325, a WIFI component 322, an Ethernet component 323 and a Bluetooth component 324. The premises device 300 includes electronics and software in the form of an I/O controller 320 (which may be a general purpose input/output controller or GPIO controller), a WI-FI component 322, an ETHERNET component 323 and a BLUETOOTH component 324 that allow for communicating with external devices near the premises device at the premises or included in a site or plant area, such as fire alarms, smoke detectors, temperature sensors, humidity sensors, glass-break sensors, earthquake sensors, electric control panels, water monitors, gas monitors, electric monitors, light sensors, door sensors, window sensors, motion sensors, routers, firewalls, proximity sensors and other security system and monitoring system components, devices and control panels. All of the components in the premises device 300 may communicate over a single bus 314 or over multiple internal buses or other communication lines. The premises device 300 may provide alerts and/or information via an audio speaker 340 and lights such as LEDs (not shown) on a box or external unit. The premises device 300 has physical connectors that allow for connection to landline telephone, Ethernet cable, and a myriad of sensors, components, security devices and control panels.

In some implementations the premises device may include a rules engine that allows it to act independently as well as in conjunction with the cloud application on the cloud server. In this way, when highly urgent or important event triggers occur, the premises device can act on its own without communicating with the cloud server. This autonomous operation is important when lines of communication with the cloud server are down due to an unexpected or emergency situation such as an act of Nature or a power outage, or the cloud server being down. This autonomous operation of the premises device allows for actions to be taken by the premises device upon the occurrence of triggers and conditions when the cloud server is unavailable, inaccessible or upon emergency conditions.

Processes

Figure 4:
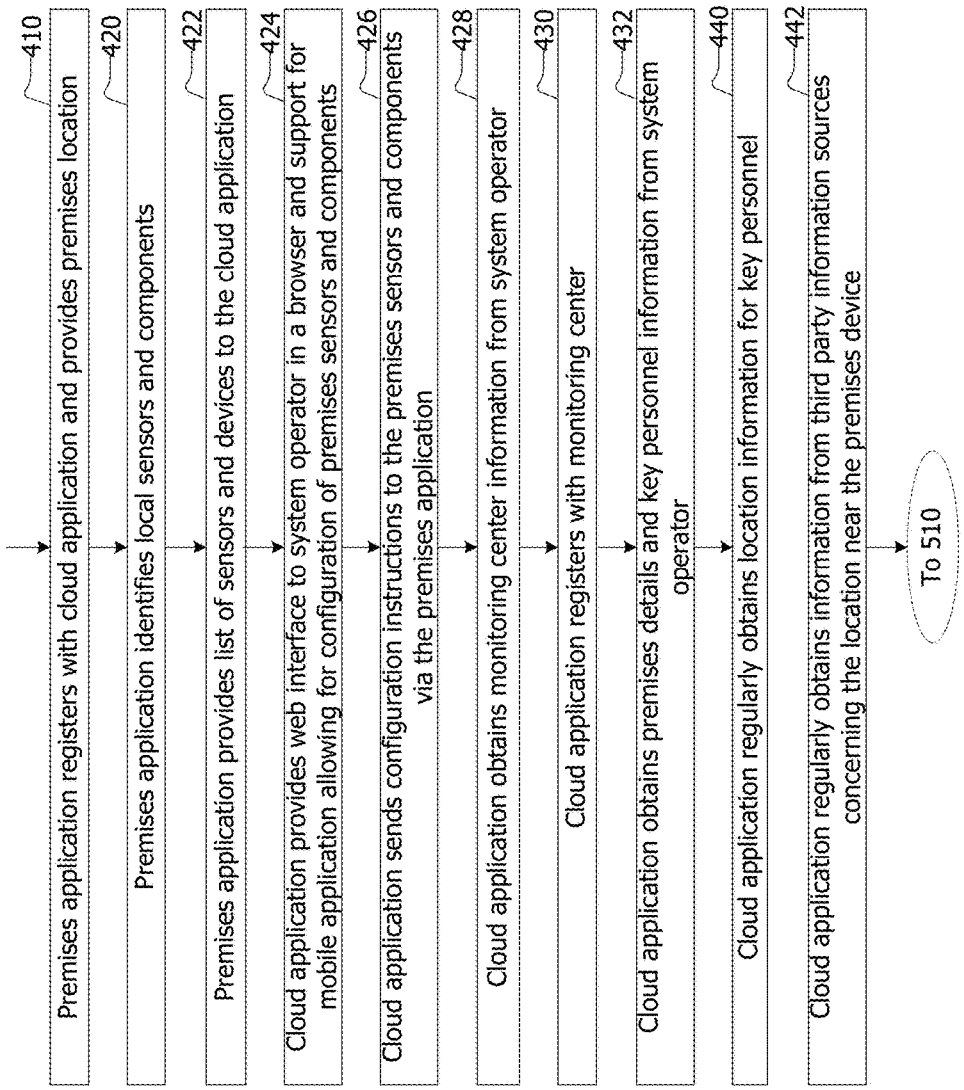
FIG. 4 is a flow chart of actions taken according to the systems and methods described herein.
Figure 5:
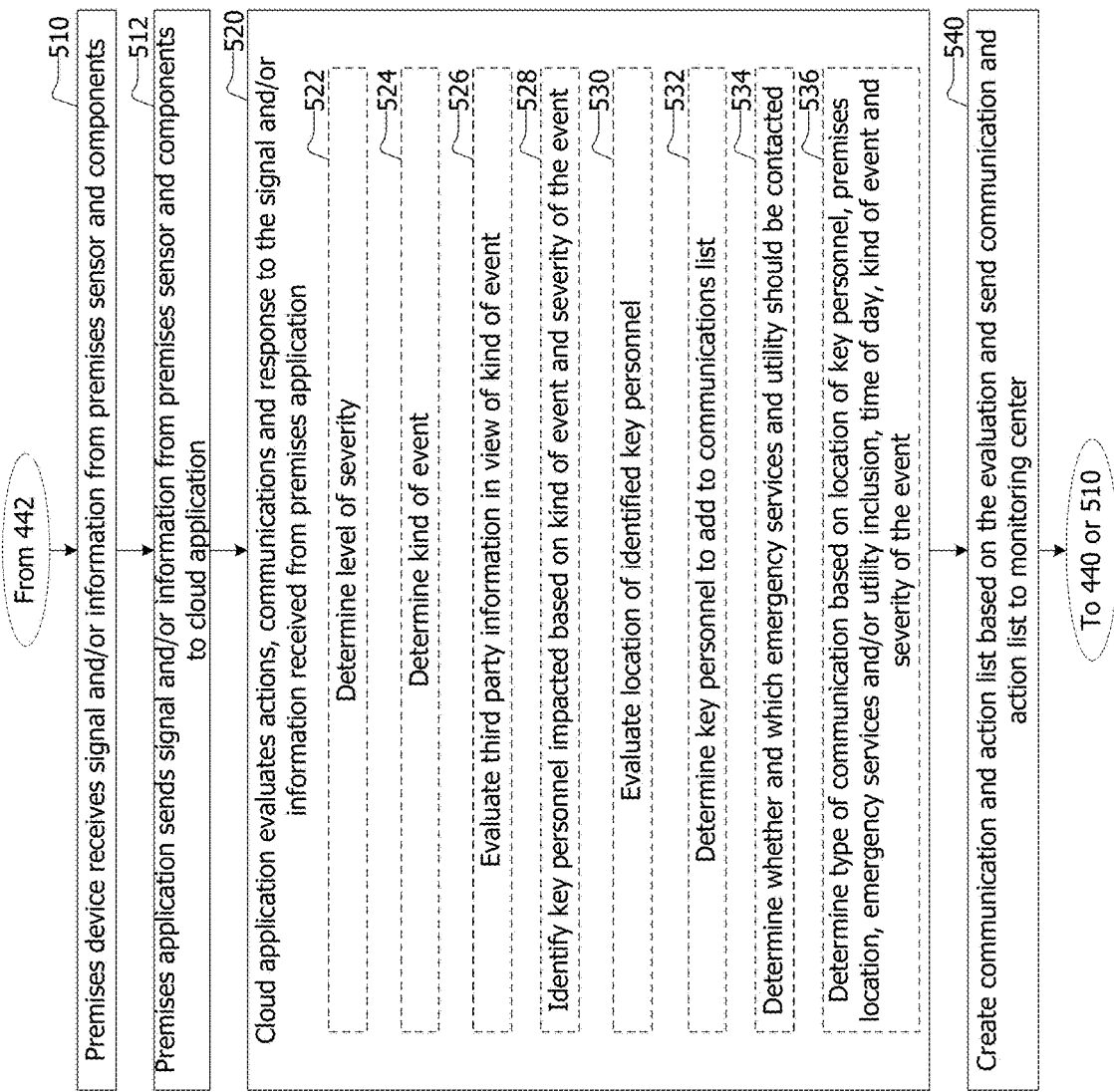
FIG. 5 is a flow chart continuing the actions from FIG. 4 taken according to the systems and methods described herein.

FIGS. 4 and 5 are flow charts of actions taken according to the systems and methods described herein. FIG. 5 is a continuation from FIG. 4. Blocks 410 through 432 of FIG. 4 describe actions taken as part of the initial configuration of the premises device with the cloud application and the premises devices and components with the premises application. Starting with FIG. 4, the premises application registers with the cloud application and provides premises location for the premises device, as shown in block 410. The premises application may obtain its location from GPS signals, using the Internet address of the premises device or provided IP address by an internet service provider to the premises device. Depending on the kind of premises, the premises application may regularly check in with the cloud application, such as when the premises device is on a boat, recreational vehicle or other movable structure or vehicle. The premises includes property and buildings, structures or vehicles adjacent to where the premises device is located. The premises application identifies local sensors and components that are in communication with the premises device, as shown in block 420. As described above, this could be by wireless or wired communications. The premises application provides list of sensors and devices to the cloud application, as shown in block 422. The cloud application provides a web interface to a system operator in a browser and support for a mobile application allowing for configuration of premises sensors and components by the system operator, as shown in block 424. The cloud application sends configuration instructions received from the system operator to the premises sensors and components via the premises application, as shown in block 426. As part of the initial configuration of the premises device with the cloud application, the cloud application obtains monitoring center information from the system operator, as shown in block 428, and the cloud application registers with the monitoring center, as shown in block 430.

The cloud application obtains premises details and key personnel information from the system operator, as shown in block 432. The actions here include obtaining names, titles, roles, positions and contact information for owners, managers, leaders, in-house maintenance staff, in-house cleaning staff, and the like of the business at the premises and/or of the premises itself. In addition, the cloud application provides an interface allowing the system operator to specify key personnel from third party service providers such as electricians, plumbers, HVAC contractors, cleaning company, landscaping company, and the like. This specification includes the names, titles, roles, positions and contact information for key people at the third party service providers. For all key personnel, designation of times available via specified communication media may be provided, such as home phone, work phone, mobile phone, email, SKYPE, WHAT'S APP, etc. In one embodiment, the cloud application regularly obtains location information for key personnel, as shown in block 440, so that decisions can be made about which key person from key personnel may be closest to the premises at a particular time. This allows for real-time decisions about who is best to contact to respond to an event.

The cloud application regularly obtains information from third party information sources concerning the location near the premises device, as shown in block 442. The cloud application communicates with multiple third party resources to obtain information pertinent to the decisions to be made and actions to be taken in response to local signals and information. The third party information sources include weather forecast providers, weather incidents providers, fire information, flood information, police activity, emergency service information, utilities such as water, electricity and gas as well as internet connectivity.

Referring now to FIG. 5, the premises device receives a signal and/or information from premises a sensor and components, as shown in block 510. Examples of the kinds of signals and information include fire alert, temperature alert, smoke alert, door open alert, broken glass alert, humidity alert, water flow alert, roof access alert, biometric device access, fingerprint device access, retinal scan device access, Internet access down alert, window open alert, gun shot detected, electricity off alert, electricity use high alert, and others. The premises application sends the signal and/or information received from the premises sensor and components to the cloud application, as shown in block 512.

The cloud application then evaluates actions, communications and response to the signal and/or information received from premises application, as shown in block 520. Multiple steps and actions are taken in this evaluation, some of which may be concurrent, other of which are sequential, and some or all may be iterative. The level of severity may be determined, as shown in block 522. This may be dome by evaluating the difference in a current signal or information compared to normal signal or information. If a door open, then the determination is binary and simple. If a high temperature signal is received a further evaluation is made to determine how high the temperature is, and then machine learning and additional ongoing analysis and review of ongoing signals from the temperature sensor may be made. In some circumstances information from multiple sensors is evaluated concurrently to assist with a more accurate determination. For example, if a smoke alarm with a very high temperature showing a great difference from a normal temperature, then a determination may be made there is a fire, such that the event is a severe event. Similarly, if there is a high temperature that is 15 degrees greater than normal, and there is no smoke alert, then it may be an HVAC issue, and the cloud application may decide to alert an HVAC professional on the list of key personnel for the premises in addition to a building manager or other person associated with the infrastructure of the premises. This falls into the cloud application determining the kind of event, as shown in block 524. The cloud application may include both machine learning and an initial set of rules to assist in the evaluation of the severity and kind of event.

The cloud application also evaluates third party information in view of the kind of event, as shown in block 526. Continuing the same example, if a high temperature alert is received, a check of local weather conditions and local fire information may be made in evaluating who should be contacted in response to the high temperature alert. A more simple system may evaluate the temperature only and conclude a higher temperate is not a very important event. But checking the weather and fire conditions local to the premises may cause the system to elevate the severity of the event and more quickly notify key personnel and characterize the event as possible important to life and property rather than an inconvenience. The cloud application identifies key personnel impacted based on the kind of event and severity of the event, as shown in block 528. This group of key personnel is only a working set that is refined based on additional information. In this vein, the cloud application evaluates the location of identified key personnel, as shown in block 530. The location information may be based on static information entered by a system operator as to typical location during work hours and off-work hours. The location information may be based on real-time location information described above regarding block 440.

Returning back to FIG. 5, the cloud application determines those key personnel to add to communications list based on specialty of the personnel, location of the personnel, severity of the event, and kind of the event, as shown in block 532. This may include narrowing or expanding the list created in block 528 (described above), depending on the pertinent information and factors. In conjunction with or after determining which key personnel to contact (block 532), a determination is made whether and which emergency services and/or utility should be contacted. This includes consideration of the kind of event and severity of the event. For example, if a gas leak is detected the local fire department and gas company many be selected to be called immediately. The cloud application determines the type of communication to use based on location of key personnel, premises location, emergency services and/or utility inclusion, time of day, kind of event and severity of the event, as shown in block 536. Other information and factors may be included in determining the type of communication. The type of communication includes email, text message, direct message, automated voice phone call, other text message, and others. The cloud application then creates a communication and action list for the monitoring center based on the evaluation and send the communication and action list to the monitoring center, as shown in block 540. The flow of actions then continues at blocks 440 and/or 510.

In one implementation in addition to creation a communication and action list send to the monitoring center, the cloud application may directly contact emergency services or utilities in certain situations where life or property is at risk, such as when a fire or gas leak is detected. Similarly, the cloud application may instruct the premises device to activate the sprinklers or run the air conditioning in certain circumstances.

In another embodiment, block 520 is altered so that the evaluation is not only triggered by signals from sensors and components at the premises are may also be triggered by information in the form of warnings and alerts from third party information sources. For example, if there is a fire in an adjacent community, the cloud application may learn of a possible impending fire emergency and evaluate who should be alerted and what kind of message to send according to the actions in block 522 through 540. Similarly, if there is a weather alert such as an impending or forecast downpour, heatwave, snowstorm, hurricane, tornado, earthquake and the like received by the cloud application, the cloud application may evaluate who should be alerted and what kind of message to send according to the actions in block 522 through 540.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system comprising:
a server computer including a processor, a server storage device, memory, a communications device all coupled with a bus, the communications device coupled with the Internet, the server storage device having instructions stored thereon which when executed cause the server to execute a cloud application and perform actions including communicating with a plurality of third party data sources including at least three selected from the group including a weather forecast provider, a current weather condition provider, a police activity provider, a fire activity provider, a government emergency alert provider, a water company, an electric company, an Internet status provider;
a premises device at a first location, the premises device having a processor, a memory, and a plurality of communications devices all coupled with a bus, the communications devices supporting a wired Internet connection and/or a wireless Internet connection,
the premises device in local communication with a plurality of premises sensors including at least three selected from the group including: door sensors, window sensors, roof sensors, at least one humidity sensor, a water system sensor, an electrical system sensor, at least one temperature sensor, fire sensors, at least one access reader device, at least one gunshot detector, at least one motion detector, at least one network device, at least one glass break sensor, an alarm panel, a keypad, a man-trap, a card reader, a retina reader, smoke sensors, a fingerprint reader, an analog phone, a SIP phone, a virtual wire, and a tamper detector, wherein the local communication is wired or wireless or a combination of wired and wireless
the premises device further including a storage device coupled with the bus, the storage device having instructions stored thereon which when executed cause the premises device to execute a premises application and perform actions including:
reporting active premises sensors to the cloud application,
receiving configuration information for the active premises sensors from the cloud application,
regularly receiving signals from the active premises sensors,
reporting received signals to the cloud application using one of the communications devices;
the cloud application regularly polling and/or receiving signals from the premises sensors,
the cloud application receiving key person information for a plurality of key persons, the key person information including at least three of the following: home phone number, cellular telephone number, email address, home address, a role designation, a specialty designation, hours at home, hours at work, wherein in the key persons include employees and leaders of a company at the first location and service providers of the company at the first location
the cloud application receiving business hours information for the company at the first location
the cloud application regularly polling and/or receiving third party information including:
Internet status and alerts for an area including the first location from the local Internet provider,
utility alerts from for the area including the first location from at least one utility activity provider,
weather information for the area including the first location from a weather information provider,
emergency alerts concerning the area including the first location from the local government emergency alert provider;
the cloud application in communication with a monitoring center;
upon receipt of signals from the premises application, the cloud application evaluating an action to take in real-time, the evaluating including considering a current time of day, a kind of signal, a source of the signal, a day of the week, information from the third party information sources and further including determining whether to send an alert to a key person based on matching a specialty of the key person with a kind of the source of the signal, a current location or home address of the key person in relation to the first location, and third party information, the actions selected from a list including texting at least one key person, sending an email note to at least one key person, sending instructions via at least one communication channel to the monitoring center to take further action.

2. The system of claim 1 wherein the active premises sensors include at least three selected from the group including a temperature sensor, an electrical plant, a motion sensor, a biometric sensor, a humidity sensor, a fire sensor, a door sensor, a window sensor, an alarm panel, a keypad, a man-trap, a card reader, a retina reader, a smoke sensor, a fingerprint reader, an analog phone, a SIP phone, a virtual wire, a tamper detector.

3. The system of claim 1 wherein the cloud application receiving key person information for a plurality of key persons includes receiving geographical location information for at least one of the plurality of key persons.

4. The system of claim 1 wherein the cloud application receiving key person information for a plurality of key persons includes receiving pairings of location and contact information for at least one of the plurality of key persons.

5. The system of claim 1 wherein the cloud application receiving key person information for a plurality of key persons includes regularly receiving current location information of at least one of the plurality of key persons.

6. The system of claim 1 wherein wherein the wired Internet connection includes a telephone system connection.

7. The system of claim 1 wherein the wireless Internet connection includes a cellular telephone connection, a satellite communications connection, and/or a WiFi connection.

8. The system of claim 1 wherein the premises device includes onboard sensors for temperature, humidity, and/or sound such that the sensors are included in or directly coupled with the premises device.

9. The system of claim 1 wherein sending instructions via at least one communication channel to the monitoring center includes sending a revised communication list by email or text message.

10. The system of claim 1 wherein the cloud application regularly polling and/or receiving includes at least one of:
   obtaining or receiving the electric grid status and alerts for the area including the first location from the electric company,
   obtaining or receiving water system status and alerts concerning the area including the first location from the water company,
   obtaining or receiving gas system status and alerts concerning the area including the first location from the gas company.

11. The system of claim 1 wherein the cloud application regularly polling and/or receiving weather information includes at least one of:
   obtaining weather forecasts for the first location from a weather forecast provider,
   obtaining current weather information and weather alerts concerning the first location from a current weather condition provider.

12. The system of claim 1 wherein the cloud application includes a rules engine comprising a plurality of rules each including at least one trigger, a scope, at least one condition and at least one action.

13. The system of claim 1 wherein the cloud application implements machine learning such that triggers and conditions included in rules are automatically evaluated and changed based on continuing operation of the system.

14. A system comprising:
   a server computer including a processor, a server storage device, memory, a communications device all coupled with a bus, the communications device coupled with the Internet, the server storage device having instructions stored thereon which when executed cause the server to execute a cloud application and perform actions including communicating with a plurality of third party data sources;
   a premises device at a first location, the premises device having a processor, a memory, and a plurality of premises communications devices all coupled with a bus, the premises communications devices supporting a wired Internet connection and/or a wireless Internet connection,
      the premises device in local communication with a plurality of premises sensors, wherein the local communication is wired or wireless or a combination of wired and wireless
      the premises device further including a storage device coupled with the bus, the storage device having instructions stored thereon which when executed cause the premises device to execute a premises application and perform actions including:
         reporting active premises sensors to the cloud application,
         receiving configuration information for the active premises sensors from the cloud application,
         regularly receiving signals from the active premises sensors,
         reporting received signals to the cloud application using one of the premises communications devices;
   the cloud application regularly polling and/or receiving signals from the premises sensors,
   the cloud application receiving key person information for a plurality of key persons, the cloud application receiving business hours information for a company at a first location
   the cloud application regularly polling and/or receiving third party information including:
      Internet status and alerts for an area including the first location from a local Internet provider,
      utility alerts for the area including the first location from at least one utility activity provider,
      weather information for the area including the first location from a weather information provider,
      emergency alerts concerning the area including the first location from a local government emergency alert provider;
   the cloud application in communication with a monitoring center;
   upon receipt of signals from the premises application, the cloud application evaluating an action to take in real-time, the evaluating including considering a current time of day, a kind of signal, a source of the signal, a day of the week, information from the third party information sources and further including determining whether to send an alert to a key person based on matching a specialty of the key person with a kind of the source of the signal, a current location or home address of the key person in relation to the first location, and third party information, the actions selected from a list including texting at least one key person, sending an email note to at least one key person, sending instructions via at least one communication channel to the monitoring center to take further action.

15. The system of claim 14 wherein the third party data sources include at least three selected from the group including: a weather forecast provider, a current weather condition provider, a police activity provider, a fire activity provider, a government emergency alert provider, a water company, an electric company, and an Internet status provider.

16. The system of claim 14 wherein the premises sensors include at least three selected from the group including: a door sensor, a window sensor, a roof sensor, at least one humidity sensor, a water system sensor, an electrical system sensor, at least one temperature sensor, a plurality of fire sensors, at least one access reader device, at least one gunshot detector, at least one motion detector, at least one network device, and at least one glass break sensor, an alarm panel, a keypad, a man-trap, a card reader, a retina reader, a smoke sensor, a fingerprint reader, an analog phone, a SIP phone, a virtual wire, a tamper detector.

17. The system of claim 14 wherein the premises sensors include at least three selected from the group including: a temperature sensor, an electrical sensor, a motion sensor, a biometric sensor, a humidity sensor, a fire sensor, a door sensor, a window sensor, an alarm panel, a keypad, a man-trap, a card reader, a retina reader, a smoke sensor, a fingerprint reader, an analog phone, a SIP phone, a virtual wire, a tamper detector.

18. The system of claim 14 wherein the key person information includes at least three of the following: home phone number, cellular telephone number, email address, home address, a role designation, a specialty designation, hours at home, hours at work.

19. The system of claim 14 wherein the key persons include employees and leaders of a company at the first location and/or service providers of the company at the first location.

20. The system of claim 14 wherein the cloud application receiving key person information for a plurality of key persons includes receiving geographical location information for at least of the plurality of key persons.

21. The system of claim 14 wherein the cloud application receiving key person information for a plurality of key persons includes receiving pairings of location and contact information for at least one of the plurality of key persons.

22. The system of claim 14 wherein the cloud application receiving key person information for a plurality of key persons includes regularly receiving current location information of at least one of the plurality of key persons.

23. The system of claim 14 wherein the wired Internet connection includes a telephone system connection.

24. The system of claim 14 wherein the wireless Internet connection includes a cellular telephone connection, a satellite communications connection, and/or a WiFi connection.

25. The system of claim 14 wherein the premises device includes onboard sensors for temperature, humidity, and/or sound such that the sensors are included in or directly coupled with the premises device.

26. The system of claim 14 wherein sending instructions via at least one communication channel to the monitoring center includes sending a revised communication list by email or text message.

27. The system of claim 14 wherein the cloud application regularly polling and/or receiving includes at least one of:
obtaining or receiving the electric grid status and alerts for the area including the first location from the electric company,
obtaining or receiving water system status and alerts concerning the area including the first location from the water company,
obtaining or receiving gas system status and alerts concerning the area including the first location from the gas company.

28. The system of claim 14 wherein the cloud application regularly polling and/or receiving weather information includes at least one of:
obtaining weather forecasts for the first location from a weather forecast provider,
obtaining current weather information and weather alerts concerning the first location from a current weather condition provider.

29. The system of claim 14 wherein the cloud application includes a rules engine comprising a plurality of rules each including at least one trigger, a scope, at least one condition and at least one action.

30. The system of claim 14 wherein the cloud application implements machine learning such that triggers and conditions included in rules are automatically evaluated and changed based on continuing operation of the system.

* * * * *